(No Model.)
F. GILES.
DRAFT HOOK.
No. 507,429.  Patented Oct. 24, 1893.
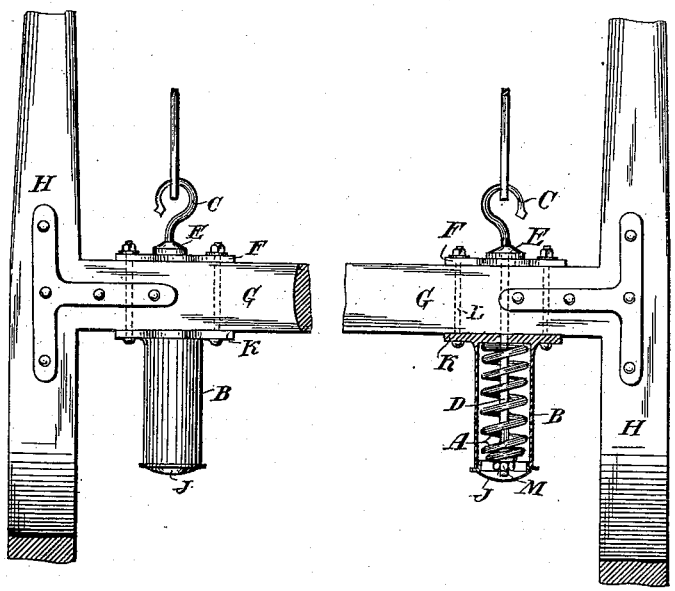
Fig:1.   Fig:2.
Witnesses:
E. K. Sturtevant.
A. S. Büsing
Inventor:
Frederick Giles,
by
Edwards & Co.
attorneys.

UNITED STATES PATENT OFFICE.

FREDERICK GILES, OF SOUTH YARRA, VICTORIA.

DRAFT-HOOK.

SPECIFICATION forming part of Letters Patent No. 507,429, dated October 24, 1893.

Application filed January 28, 1893. Serial No. 459,954. (No model.)

*To all whom it may concern:*

Be it known that I, FREDERICK GILES, engineer, a subject of the Queen of Great Britain, and a resident of Tivoli Road, South Yarra, in the Colony of Victoria, have invented a certain new and useful Improved Appliance for Use in Connection with Trace-Hooks in Vehicles, of which the following is a specification.

This invention is devised to prevent any shock passing from the traces to the body of a vehicle when a sudden motion or pull is made by the animal, as in starting or passing over obstructions. Instead of securing the trace hook rigidly to the cross-piece connecting the shafts of a vehicle, I elongate the rod of the trace hook and pass same within and through a spirally coiled spring and secure it against the said spring with a nut, so that any shock or vibration is neutralized by the elasticity or cushioning of the spring and very little, if any, transmitted to the body of the vehicle.

I will now refer to the drawings in which—

Figure 1 is a plan view of the appliance showing its connection with a cross piece connecting shafts. Fig. 2 is a similar view but with part shown in section.

The invention consists of a metal spring "A" coiled into spiral form and inclosed within a cylindrical box or casing "B," one end of spring being formed to rest evenly against the inner end of the box "B" and the final coil at the outer end being preferably reduced in circumference to form a stop by which the rod of trace hook may be held in position by a nut "M." This nut can be screwed up or loosened as required to increase or decrease the elastic tension of the spring "A." The trace hook "C" may be of the usual circular form but its rod "D" is elongated to pass through the coiled spring. A stop "E" is provided on the hook to operate against a plate "F" secured to the crosspiece "G" which connects the shafts "H." The rod "D" is formed of square section and is passed through a corresponding bore formed in plate "F" through the cross-piece "G" and within and through the coiled spring "A" and is terminated in a thread to which the nut "M" is screwed and held in position against the spring "A." The cylindrical box "B" inclosing the spring and rod has its inner end closed in to form a flange "K" for securing said box to cross piece. Bolts "L" pass through the cross piece and are secured against the plate "F" by means of nuts.

The outer end of box "B" is preferably closed in with a cap "J" which may be screwed or otherwise secured in position.

Having now particularly described and ascertained the nature of my said invention and in what manner the same is to be performed, I declare that what I claim is—

In combination with the cross piece G, the hook C passing through the same having a stop E at its front end and a nut at its rear end, the cylindrical casing on the rear side of the cross piece fitting over the hook shank, the spring in said casing about the hook shank, the plate F on the front of the cross piece to be struck by the stop E and the means for holding the rear casing and front plate in place consisting of the bolts extending through the cross piece and engaging said parts, substantially as described.

In witness whereof I have hereunto set my hand in presence of two witnesses.

FREDERICK GILES.

Witnesses:
   A. O. SACHSE, *M. L. C.*,
      *Melbourne, Victoria.*
   C. W. WADE,
      *Clerk to A. O. Sachse.*